May 14, 1957 C. W. BURNHAM 2,791,817
LINEMAN'S SAFETY HOOK
Filed Nov. 12, 1953
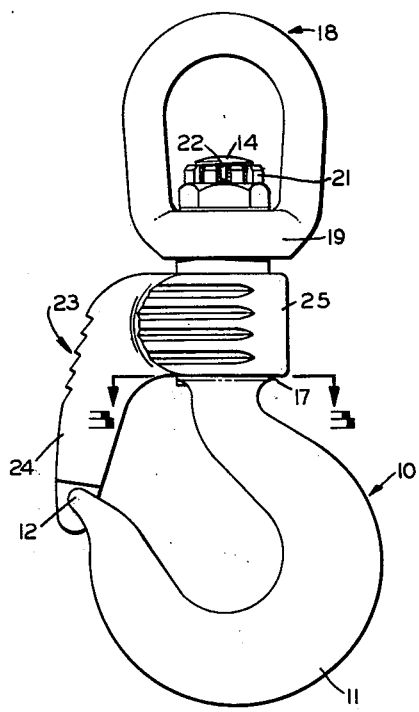
FIG_1
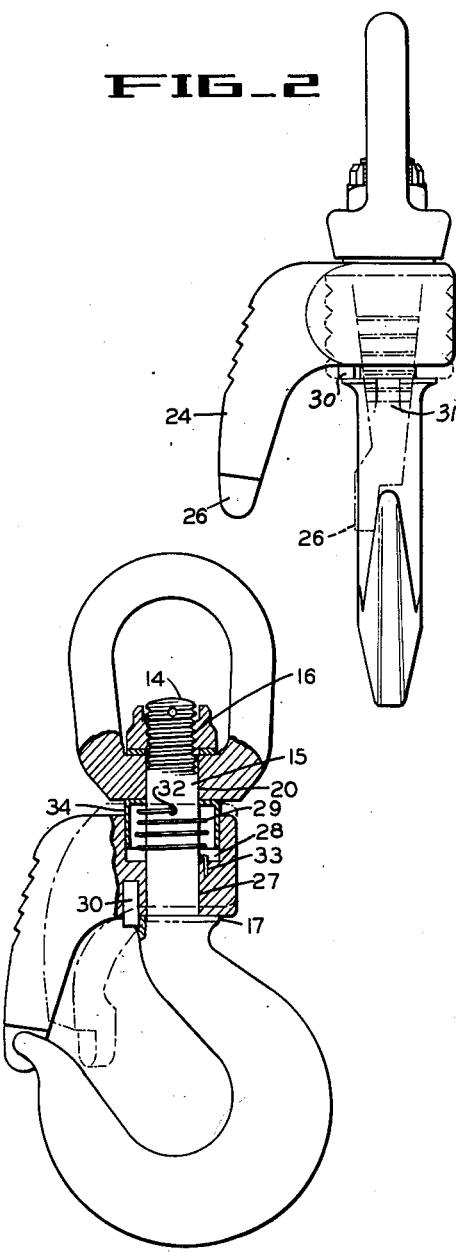
FIG_2
FIG_4
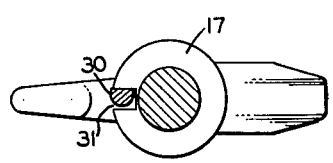
FIG_3
INVENTOR.
CLAUDE W. BURNHAM
BY ECKHOFF & SLICK
ATTORNEYS United States Patent Office 2,791,817
Patented May 14, 1957

2,791,817

LINEMAN'S SAFETY HOOK

Claude W. Burnham, Sacramento, Calif., assignor to E. D. Bullard Company, a corporation of California Application November 12, 1953, Serial No. 391,451

1 Claim. (Cl. 24—241)

This invention relates to a safety hook, and particularly one intended for use on a linesman's belt.

Various safety hook constructions have been proposed heretofore; these generally have included an element movable between an open position and one in which the element provides a closure across the throat of the hook. Such devices have generally been complicated and unreliable in that any force tending to move the element out of throat-closing position is effective to release the throat closing element and permit its movement to a throat open position in which the hook can be disengaged.

In accordance with the present invention, I provide a safety hook in which a throat-closing element is movable into and out of a position in which the throat of the hook is closed; the element is retained in throat closing position and can only be released for movement out of that position by a force applied in a direction which is ineffective to move the element out of throat-closing position. Thus, in accordance with the present invention, I provide a throat-closing element mounted rotatably upon the shank of the hook and which is rotatable thereon into and out of throat closing position and which is normally locked in throat-closing position; the element can only be moved therefrom by a force applied axially of the hook shank and in a direction such that the throat-closing member slides along the shank of the hook. Thus, a force which is effective to release the element is ineffective to rotate the element and vice versa.

In general, it is an object of the present invention to provide a new and improved safety hook of the type described.

A further object of the present invention is to provide a safety hook in which the throat-closing element is held locked in throat-closing position and cannot be moved from that position except by a force applied in the direction generally normal to that required to move the throat-closing means from throat-closing position.

The invention includes other objects and features of advantage, some of which, together with the foregoing will appear hereafter wherein the present proposed form of hook is disclosed. In the accompanying drawings forming a part of this application:

Figure 1 is a side elevation of a safety hook embodying the present invention.

Figure 2 is an end view of the safety hook of the present invention, showing the safety catch in an opened position in solid lines and in a closed position in broken lines.

Figure 3 is a view on the line 3—3 of Figure 1.

Figure 4 is a side view, part in section, showing the inner mechanism of the safety hook.

Referring now to the drawings by reference characters, the numeral 10 designates a hook in general which may be made of any suitable material such as steel or aluminum. The hook 10 includes a curved portion 11 which terminates in a pointed terminal end 12. Extending from the hook 10 and formed integrally therewith is a shank 14; the shank 14 includes a bearing portion 15, an externally threaded end 16 while an annular shoulder 17 is arranged contiguous to the lower end of the bearing portion 15.

Mounted on the shank 14 is an eye 18 adapted to be attached to the end of a safety belt, to a hoisting cable or the like. The eye 18 includes a web 19 which is provided with an opening 20 fitting the shank 14. A suitable securing element such as washer 40, castellated nut 21, and a pin 22 serve to hold the eye in place on the end of the shank and permit the eye to rotate freely on the shank.

The hook of the present invention is provided with a safety latch 23 which includes an arm 24 and a shoulder 25. The arm 24 terminates in a tip 26 which, when the arm is in throat-closing position, engages the tip of the hook 12 and so closes the throat. The shoulder 25 has an opening 27 which fits snugly on the bearing portion 15 of the hook and a recessed portion 28 to receive a spring 29. One end of the spring 29 is mounted in an opening 32 in the shaft 20 while the other end of spring is mounted in an opening 33 in the shoulder 25. Extending from the shoulder 25 on the latch is a pin 30 adapted to slide into and out of slot 31 in the shoulder 17 on the shank of the hook. The spring is protected from the entrance of dirt, by a cup-like member 34 which fits the bearing portion 15 and provides an additional bearing surface between the eye and the hook.

The spring 29 is biased to provide a bias circumferentially and axially of the shank of the hook and thus has a two-fold function. This is attained by having the spring simultaneously compressed between its ends and in torsion. Thus, the spring 29 biases the shoulder 25 toward engagement with the shoulder 17 and so urges the pin 30 to engage slot 31. Additionally, the spring biases the member 23 rotationally so that normally the member 26 is in contact with the point of the hook 12, and the pin is in position to slide and enter the slot.

In the closed position, the action of the spring 29 is such that it holds the member 23 snugly against the shoulder on the hook 17, the pin 30 being engaged in the opening 31. When it is desired to open the hook, the member 23 is first slid axially along the shank of the hook until the pin 30 is disengaged from the slot 31; member 23 can then be rotated to the position shown in solid lines in Figure 2 for the insertion or release from the throat of the hook of an eye or a sling or the like. When the member 23 is released, the spring 29 rotates the member 23 about the shank until pin 30 can enter slot 31, whereupon the spring forces the pin into the slot and so locks the safety arm in place.

From the foregoing, it is apparent that I have provided a safety hook which includes a member which serves as a safety device on a hook, as well as a handle for operating the safety device. It will be further apparent that I have provided a device which is spring-biased to the closed position and which cannot readily come open accidentally by a force applied to open the safety arm and which can be readily manipulated with one hand by an operator.

I claim:

In combination; a hook provided with a throat and including a curved portion terminating in a terminal end; a shank extending from said hook and including a cylindrical portion having a longitudinal axis and a flange at that end of said cylindrical portion adjacent said throat; a safety arm including a hub mounted for rotation on said cylindrical portion and having an arm extending from the hub, said hub being rotatable on said cylindrical portion to bring said arm into and out of bridging relation to said throat and engagement with said hook terminal end; a pin extending from said hub in a direction parallel to said longitudinal axis and adjacent to said hub and fitting into a recess in said flange when said arm is in bridging relationship to lock said arm in said bridging relationship, said hub being slidable axially on said shank away from said flange to release the pin from the recess in the flange for rotation in engagement with the flange away from and toward the recess; and a helical spring biasing the hub axially of the shank toward said flange and rotationally to bring the arm into engagement with the hook end and the pin into locking engagement with the recess in the flange upon release of said arm, said hub-mounted arm having an extended portion on the tip thereof to contact said hook terminal end and prevent rotational movement of said arm beyond said hook end in one direction whereby to insure that rotational movement of said arm away from said hook end in said one direction compresses said helical spring.

References Cited in the file of this patent

UNITED STATES PATENTS

| | | |
|---|---|---|
| 714,777 | Buck | Dec. 2, 1902 |
| 835,937 | Carlson | Nov. 13, 1906 |
| 1,595,264 | Treiman | Aug. 10, 1926 |
| 1,676,167 | Sprain | July 3, 1928 |

FOREIGN PATENTS

| | | |
|---|---|---|
| 417,961 | France | Sept. 16, 1910 |